S. J. ORANGE.
Revolving Harrow.
No. 19,259.
Patented Feb. 2. 1858.
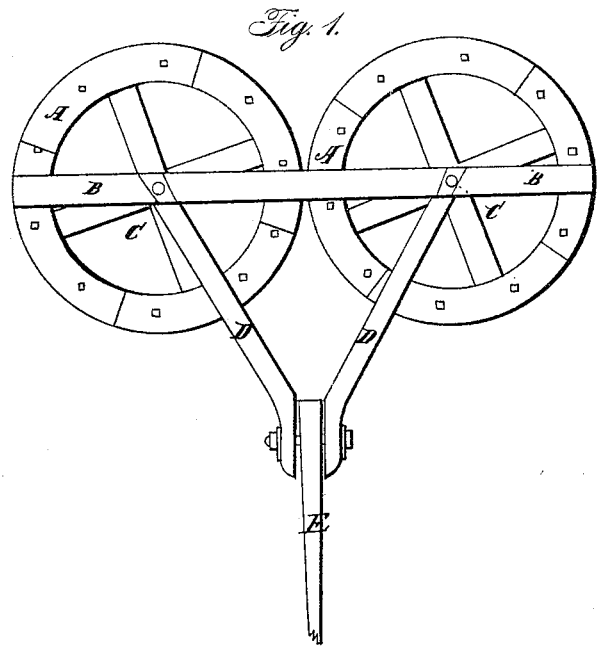
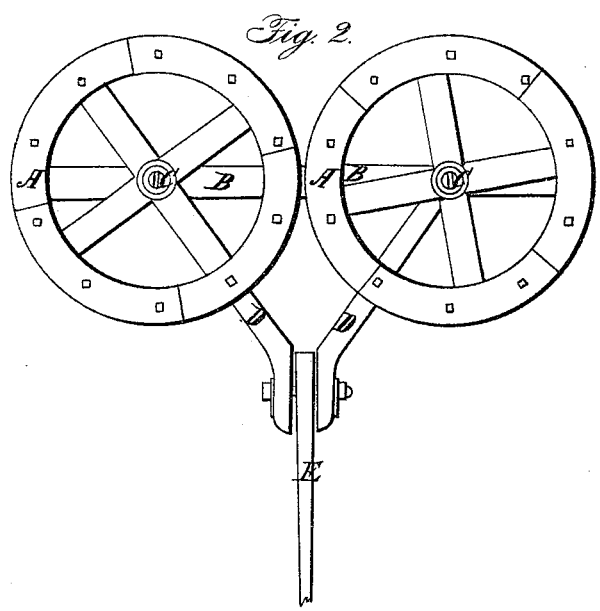
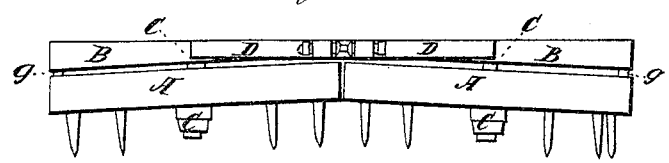

UNITED STATES PATENT OFFICE.

SAMUEL J. ORANGE, OF GRAYVILLE, ILLINOIS.

IMPROVEMENT IN HARROWS.

Specification forming part of Letters Patent No. 19,259, dated February 2, 1858.

*To all whom it may concern:*

Be it known that I, SAMUEL J. ORANGE, of Grayville, in the county of White and State of Illinois, have invented a new and useful Improvement in Harrows, the construction and operation of which I have described in the following specification and illustrated in the accompanying drawings with sufficient clearness to enable competent and skillful workmen in the arts to which it pertains or is most nearly allied to make and use my invention.

My said invention consists in the mode, hereinafter described, of connecting two revolving harrows, by which the rotation of both is secured, as hereinafter more fully set forth.

In the accompanying drawings, Figure 1 is a plan of my improved harrow. Fig. 2 is a plan inverted, or in other words an under side view. Fig. 3 is a front elevation.

A A are two circular harrows, which are connected by the beam or cross-bar B and the bolts C. These bolts are firmly fixed in the beam B, and the harrows A are allowed to revolve upon them. To insure the rotation of the harrows A, they are so hung upon the bolts or journals C that the outer side, or side under the end of the beam B, is always the lowest when the harrow stands on level ground, or in other words it takes a deeper hold of the soil than the side under the middle of the beam. This arrangement secures the rotation of the harrows in opposite directions—one revolving with the sun and the other against it—and the side draft, which would otherwise be caused by a single revolving harrow, is thus counteracted by the action of the other, and an even draft is secured. To further insure this position of the harrows, and to prevent their binding upon the journals C, I place rollers *g* in the ends of the bar B, which bear upon the arms of the harrows to keep them in position.

A pair of hounds, D, are attached to the bar B, to which the draft-pole E or a chain is attached for the team to draw by. The object of these hounds is to prevent too much dip of the forward side of the harrows, being caused by the attachment of the point of draft above the point of resistance. The upward draft of the team upon the hounds D keeps the forward side of the harrows up to their proper position.

I am aware that several harrows have been known which have either a casual or an arbitrary horizontal rotation upon a fixed axis. An instance of the former may be seen in the patent granted to Lyman Brainard and Levi Newton, April 10, 1855, and of the latter in the patent granted Charles Clareni and George P. Field, April 3, 1855, and also in the patent granted to S. S. Hogle in the early part of the year 1857. In neither of these cases, however, is a continuous rotation obtained without side draft, and those of them which have a constant rotation at all are from their principles of construction much more complicated and expensive than mine. In the harrow of Clareni and Field the rotation is produced by a horizontal shaft with bevel-pinions working into a bevel-wheel on the harrow, the horizontal shaft being propelled by means of long teeth or arms projecting from it, which enter the ground for that purpose. Hogle's harrow is made to revolve by a weight placed upon one side of it. This, besides producing a heavy side draft, has the further objection that in very rough ground the weight is liable to act very destructively by being thrown violently away from the harrow and then returning upon it with the whole force of its inertia. My harrow dispenses with the weight and has no heavy parts which are loose and may tumble about with the force of circumstances. It is cheaper and simpler in its construction and its action is more efficient.

I do not claim as such a harrow which revolves horizontally upon a vertical axis, either casually or constantly. Neither do I claim producing this rotation by pressure applied to one side of the harrow, as all these things have already been done. By placing my harrows a short distance apart and making them sufficiently small they may be used to advantage for cultivating corn before it becomes too large to allow the bar which connects the two harrows, to pass over it.

The harrows may be so attached that the side under the middle of the bar may be the lowest, if preferred.

The particular improvement which constitutes my said invention and which I claim as having been originally and first invented by me, is—

The combination of the two harrows A with the connecting-bar B or its equivalent, when the harrows are so hung as to produce by their connection with it, and thereby with each other, a continued rotation of both harrows, substantially as set forth.

SAMUEL J. ORANGE.

Witnesses:
A. A. WHITE,
MICHAEL SMITH.